United States Patent [19]

Merten

[11] 4,297,674
[45] Oct. 27, 1981

[54] PASSIVE SECURITY DEVICE
[75] Inventor: Richard C. Merten, Omaha, Nebr.
[73] Assignee: Jubilee Manufacturing Co., Omaha, Nebr.
[21] Appl. No.: 86,117
[22] Filed: Oct. 18, 1979
[51] Int. Cl.³ .............................................. B60R 25/10
[52] U.S. Cl. ....................................... 340/63; 180/287
[58] Field of Search ..................... 340/64, 63; 180/287
[56] References Cited

U.S. PATENT DOCUMENTS

| | | | |
|---|---|---|---|
| 3,585,584 | 6/1971 | Behrend | 340/64 |
| 3,707,702 | 12/1972 | Plattner | 340/64 |
| 3,829,829 | 8/1974 | Teich | 340/64 |
| 3,930,226 | 12/1975 | Plumberg | 340/64 |
| 3,956,732 | 5/1976 | Teich | 340/64 |
| 4,016,537 | 4/1977 | Ray | 340/64 |
| 4,107,543 | 8/1978 | Kaplan | 340/64 |
| 4,174,516 | 11/1979 | Cleary | 340/63 |

*Primary Examiner*—Glen R. Swann, III
*Attorney, Agent, or Firm*—Henderson & Sturm

[57] ABSTRACT

An antitheft device for a motor vehicle has a pushbutton disarming circuit coupled to a passive ignition cut-out circuit and to a passive arming circuit. The ignition cut-out circuit is interposed in the automobile ignition circuit and includes an SCR switchable from "on" to "off" by the disarming circuit to permit ignition. The passive arming circuit includes a Darlington amplifier configuration, is interposed in the automobile ignition circuit, and is coupled through an exit delay circuit to the remaining circuit portions of the device: interval timing and activating circuit, square-wave generator, trigger, entrace delay and siren circuits. The amplifier configuration supplies power to operate the circuits until switched by proper actuation of the disarming circuit and automobile ignition.

11 Claims, 3 Drawing Figures

PASSIVE SECURITY DEVICE

TECHNICAL FIELD AND BACKGROUND ART

The invention relates to anti-theft devices for use with vehicles. Reference is made to the copending application entitled Alarm Device, filed Dec. 5, 1977, in the name of Mark R. Cleary, Ser. No. 856,960 (now issued as U.S. Pat. No. 4,174,516).

As pointed out in the aforementioned application, numerous devices have been devised with the object of protecting automobiles from being broken into by unauthorized people. These devices have had numerous failings, such as continuous sounding of an alarm after activation until the battery wears down or the device is manually disengaged. Inability to automatically rearm, and ease of circumvention of the triggering circuits should the intruder remain in the vehicle, were common failings of those devices which did automatically disengage. The device of the aforementioned application provided a two-tone siren alarm for automobiles that was responsive to a variety of triggers, such as transient variances in potential of the automobile electric systems and signals from pressure switches and the like. The alarm automatically terminated after a set period and rearmed, allowed for a brief delay before arming to permit an authorized user to leave the car without triggering the alarm, allowed for a brief delay before sounding after triggering to permit an authorized user to disarm the alarm, and tended to reduce wear on the battery.

The foregoing notwithstanding, further attention can always be paid to developing improved anti-theft devices. Minimizing user involvement with such a device, both during installation and during use, would tend to reduce human error and maximize effectiveness of such devices.

DISCLOSURE OF THE INVENTION

This invention of a passive security device includes a push-button disarming circuit coupled to a passive ignition cut-out circuit and to a passive arming circuit. The ignition cut-out circuit is interposed in the automobile ignition circuit and includes an SCR switchable from "on" to "off" by the disarming circuit to permit ignition. The passive arming circuit includes a Darlington amplifier configuration, is interposed in the automobile ignition circuit, and is coupled through an exit delay circuit to the remaining circuit portions of the device: interval timing and activating circuit, square-wave generator, trigger, entrace delay and siren circuits. The amplifier configuration supplies power to operate the circuits until switched by proper actuation of the disarming circuit and automobile ignition.

It is an object of this invention to provide an improved security device for use with automobiles.

Another object of this invention is to provide a security device which protects the contents of an automobile by deterring breaking into the passenger, trunk and engine compartments of a vehicle.

A further object of this invention is provision of a security device which also deters theft of the automobile itself by "hot-wiring" or by someone who has stolen the keys to the automobile.

Yet another object of this invention is to provide a security device which arms itself thereby guarding against forgetfulness on the part of the user.

It is also an object of this invention to provide a security device which disables starting the automobile unless a particular starting sequence is employed.

Another object is provision of a security device which may be selectively interposed in the automobile ignition system.

Also an object is the provision of a security device which achieves the aforementioned objects and also includes an alternating two-tone siren alarm, responsiveness to a variety of triggers including transient variances in the potential of the automobile electrical system, exit and entry delay timing, and automatic termination of the siren alarm after a certain period of time.

Provision of a security device which is conveniently installed, but capable of achieving the aforementioned objects, is an additional object of this invention.

These objects and other features and advantages of this invention of a security device will be readily apparent upon referring to the following description in conjunction with the appended drawing.

BRIEF DESCRIPTION OF THE DRAWING

The security device of this invention is illustrated in the drawing wherein.

BEST MODE FOR CARRYING-OUT THE INVENTION

Figure 1:
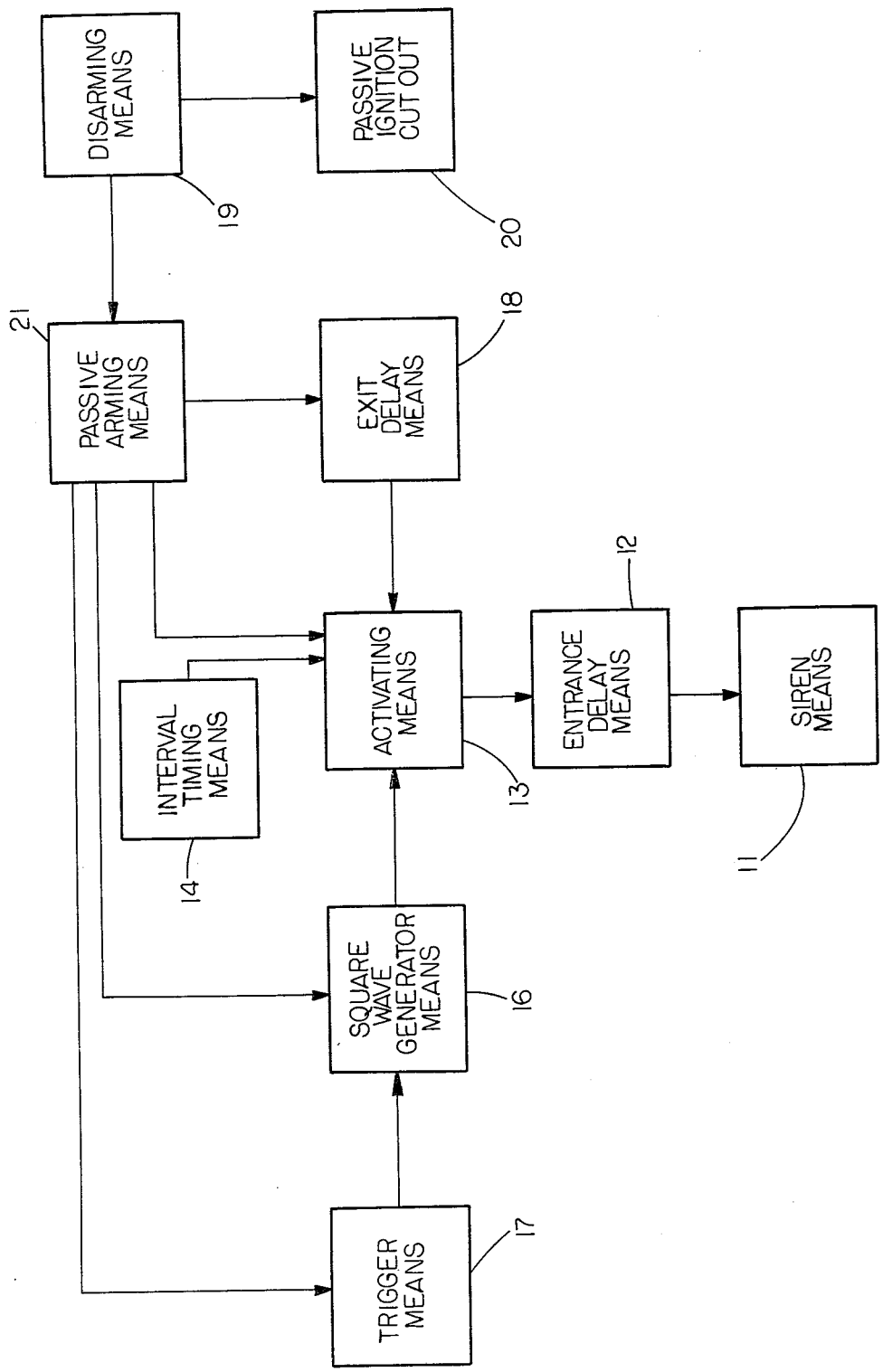
FIG. 1 is a block diagram showing the relationship of the major circuit portions.

The security device of this invention is indicated generally in the block diagram of FIG. 1. The device more particularly includes siren alarm circuitry 11, entrance delay circuitry 12, activating circuitry 13 with interval timing circuitry 14, square wave generating circuitry 16, trigger circuitry 17, exit delay circuitry 18, disarming circuitry 19, passive ignition cut-out circuitry 20 and passive arming circuitry 21. The security device is powered by the automobile battery.

Figure 3:
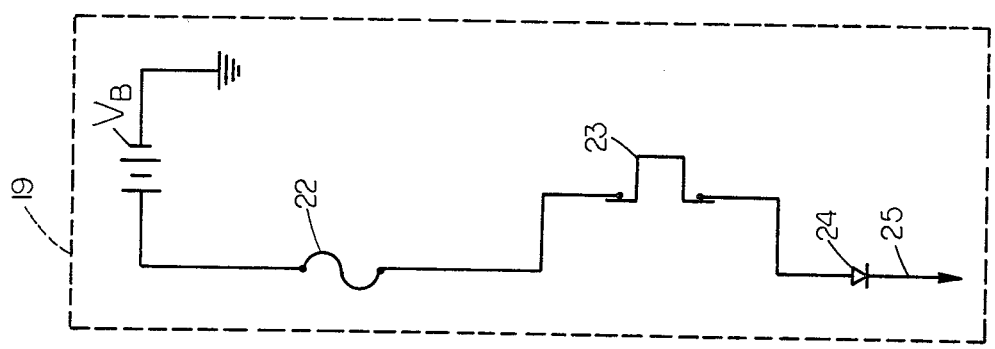
FIG. 3 is a schematic diagram of the disarming circuit portion.
Figure 2:
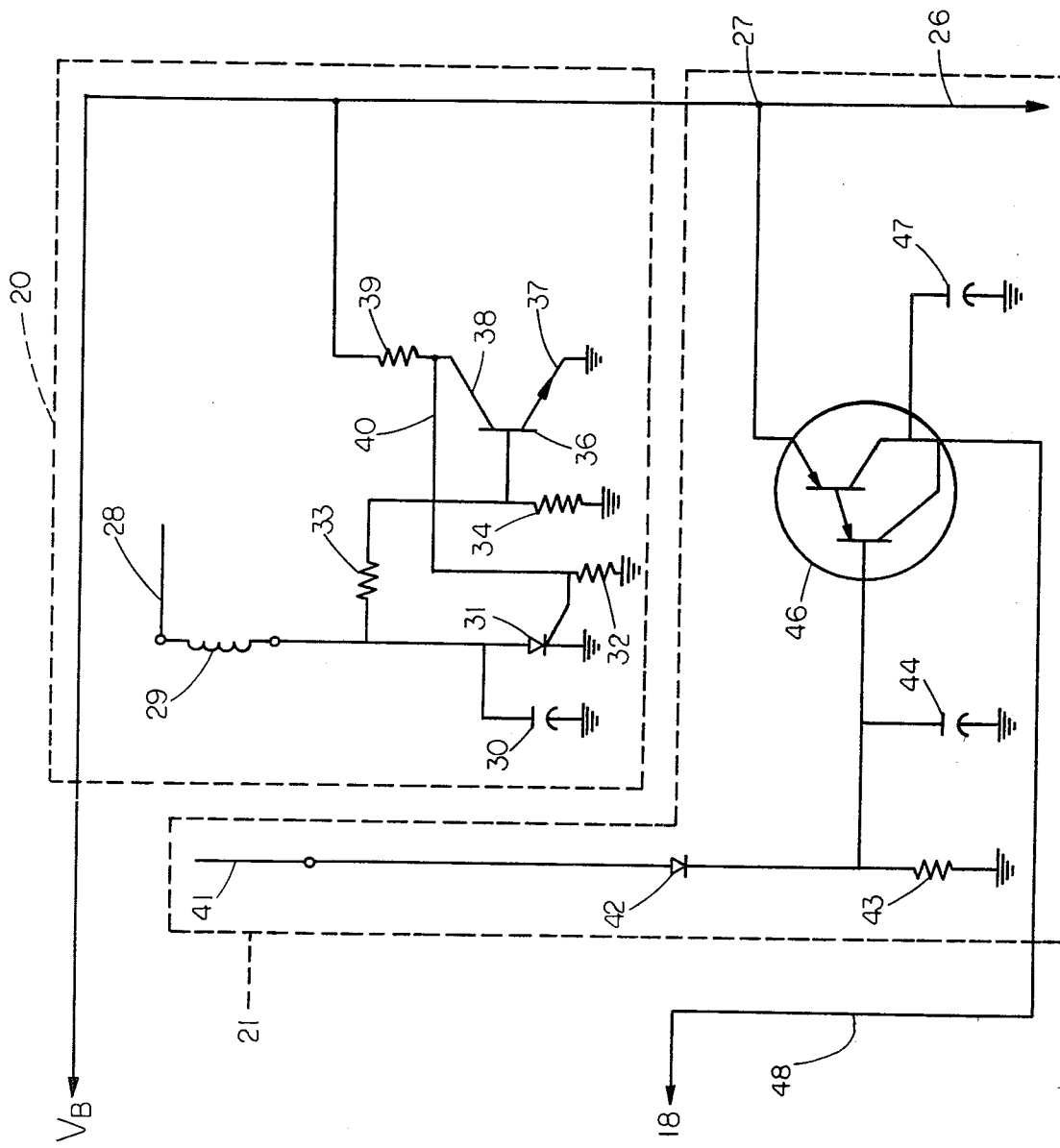
FIG. 2 is a schematic diagram of the passive ignition cut-out and the passive arming circuit portions.

The disarming circuit 19 (FIG. 3) more particularly includes a fuse 22 connected between the positive terminal of the battery $V_B$ and a normally closed, momentary break switch 23. A conductor leads from the other side of the switch 23 to the cathode side of a diode 24. A conductor 25 leads from the anode side of the diode 24 to the speaker of the siren alarm circuitry 11. Another conductor 26 (FIG. 2) is attached to conductor 25 and extends to a junction 27.

The passive ignition cut-out circuit 20 (FIG. 2) includes a conductor 28 connected to the ignition "on" contact. The conductor 28 is attached to a heavy duty relay coil 29, capable of handling at least up to 15 amp current flows. The contacts (not shown) of the relay are preferably disposed in the line which controls power to the starter solenoid of the automobile. Alternately, the contacts may be disposed in a line from the ignition coil to the distributor.

The coil 29 is connected through a 10 microfarad capacitor 30 to ground. The coil 29 is also connected to the cathode of a silicon-controlled rectifier (SCR) 31, the SCR 31 in turn being connected to ground. The capacitor 30 and SCR 31 are in parallel connection. The gate of the SCR 31 is connected through a gate resistor 32 to ground. The coil 29 is also connected through two 20k resistors 33, 34 in series to ground.

The base of an npn transistor 36 is connected between the resistors 33, 34. The emitter 37 of the transistor 36 is connected to ground. The collector 38 is connected through a 10k collector resistor 39 to the junction 27. A conductor 40 extends from the junction of the gate of the SCR 31 and the gate resistor 32 to the junction of the collector 38 and collector resistor 39.

The passive arming circuit 21 (FIG. 2) includes a conductor 41 attached to the ignition "accessory" contact. The conductor 41 is connected to the cathode side of a diode 42. The diode 42 is connected through a 10k resistor 43 to ground and also through an 0.1 microfarad capacitor 44 to ground, the resistor 43 and capacitor 44 being in parallel connection.

Two pnp transistors form a Darlington configuration 46. The resistor 43 and capacitor 44 both are connected to the base of the first transistor of the Darlington pair 46. A conductor leads from the emitter of the second transistor of the Darlington pair 46 to the junction 27. The connected collectors of the transistors 46 are attached through a 47 microfarad capacitor 47 to ground. The collectors also are attached to a conductor 48 leading to the exit delay circuitry 18.

Details of a preferred siren, entrance delay, activating and interval timing, square wave generator, trigger and exit delay circuitry 11, 12, 13, 14, 16, 17 and 18 are shown in the aforementioned copending application. Solid state and integrated circuit devices are preferred for the passive security device. The speaker of the siren circuitry 11 is preferably mounted in the engine compartment, driver's side, toward the front of the vehicle, and the relay with coil 29 is mounted on the firewall. A pin switch (not shown) is attached to the automobile where it will be engaged by the hood. All doors and the trunk may also have associated pin switches, although this is not necessary where the door or trunk activates a courtesy light. The pin switches are connected to the trigger 17 as is the automobile electrical system. The circuitry 11-14, 16-21 preferably is substantially contained in a control box mounted inside the automobile, out of sight beneath the dash. The switch 23 is located in any spot hidden from view which can be reached by the operator while starting the vehicle.

The passive security device operation will now be described. When the vehicle is parked, the user being away, the switch 23 of the disarming circuit 19 is closed. The battery $V_B$ supplies the passive ignition cut-out circuit 20, and a current signal is present at the gate of the SCR 31. The SCR 31 is "on", and the circuit 20 is armed.

The battery $V_B$ also supplies the passive arming circuit 21. A negative voltage is supplied via resistor 43 at the base of the Darlington pair 46. The capacitor 44 charges and operates to filter non-critical "noises", such as a windshield wiper or a clock in the vehicle. Having a negative voltage applied to its base, the Darlington pair 46 is switched "on". Power is supplied via conductor 48 to the rest of the passive security device circuitry 11, 12, 13, 14, 16, 17, 18, which charges and is armed as described in the copending application. The capacitor 47 charges and acts to filter noise generated in the passive security device itself, such as voltage spikes from the switching of the oscillator in the siren alarm circuit 11.

The passive security device has now armed itself without any action being taken by the vehicle user. Proper starting of the vehicle when the passive security device is armed will now be described.

When the operator opens the car door, the dome light comes on, causing a voltage drop in the automobile electrical supply. The trigger circuit 17 sends an amplified "spike" signal to the circuit 16 which in turn transmits a square wave signal. This signal actuates the activating circuitry 13 which triggers the entrance delay circuit 12. The operator is provided with about 15 seconds to properly start the vehicle.

The operator first depresses the switch 23, thereby opening the disarming circuit 19. The gate signal is thereby removed, and the SCR 31 switches "off". Two or three seconds after depressing the switch 23, and while still holding the switch 23 depressed, the operator next turns the key to the ignition "on" position. The resistors 33, 34 bias the transistor 36 on, which in turn maintains the low gate current to the SCR 31, and the SCR 31 remains "off". The operator then releases switch 23. The collector 38 is low, and this causes the gate signal to be low, thereby holding SCR 31 "off" while the automobile ignition is in the running position. During the transistion from starting to running, the capacitor 30 supplies power to the base of the transistor 36, keeping the transistor 36 "on" and the SCR 31 "off".

The operator has now started the vehicle. The vehicle may be driven in the normal fashion. Should the vehicle stall, the operator may turn the key from the "on" or "run" position to the "start" position to start the vehicle again. If the operator turns the key to the "off" or "accessory" position, then the passive security device is rearmed, and the aforementioned starting sequence again must be followed to start the vehicle.

When the key turns to the accessory contact, a positive voltage through the diode 42 overrides the negative voltage supplied via resistor 43. The positive voltage at the base then causes the transistor pair 46 to switch "off", cutting off power to the remaining circuitry 11, 12, 13, 14, 16, 17, 18.

For times when a door, the hood or the trunk must be left open for a short period, such as for loading groceries, checking the oil and the like, the operator leaves the key at the "accessory" position. With the key in the "off" position, the doors, hood and trunk may be left open as long as the switch 23 is first depressed, the door or the like is then opened within the period (about 45 seconds) provided for exit delay, and neither the pin switches nor the automobile electrical system are disturbed. When the vehicle is to be worked on in a garage, or for some other long period situation, and when the electrical system is being operated on, including times when the battery $V_B$ is being charged, the passive security device is completely disabled by removing the fuse 22.

In a case where a thief has the automobile key, opening of the door causes the entrance delay circuit 12 to operate as previously described. The thief inserts the key into the ignition and turns it. As the switch 23 is not depressed, the SCR 31 is "on". The coil 29 of the relay is energized, and the normally closed relay contacts interposed in the automobile starting system are opened. The car therefore will not start. In the starter cut-out mode, the opening of the relay contacts disables the starter, thereby preventing the battery $V_B$ from being run down or the engine from stopping due to some failure. In the ignition cut-out mode, the starter will turn over; however, the installation wiring is somewhat easier to hide to prevent detection.

In the case where the thief does not have a key, while opening the trunk, hood or any door, the Darlington pair 46 is "on". As power is being supplied, the siren alarm 11 will sound.

Industrial Applicability

The usefulness of the passive alarm device is believed to be manifest from the foregoing description. The vehicle owner cannot forget to arm the device. Both the contents of the vehicle, and the vehicle itself, are protected by the device. The provision of a proper starting sequence of operations facilitates these objects. And the other objects and advantages of the device are attained.

Although a preferred mode has been disclosed herein, it is to be remembered that various modifications and alternate constructions can be made thereto without departing from the full scope of the invention, as defined in the appended claims.

I claim:

1. A passive security device, for use with vehicles having an electrical system including a starter, and an ignition switch having "on" and "accessory" contacts, said device comprising:
    first means for connecting said device to the electrical system;
    detection and alarm means including trigger means for detecting voltage variations and producing an electrical signal in response thereto, said trigger means being connected to said first means, generating means for converting said electrical signal into a square wave signal, said generating means being connected to said trigger means, siren means for sounding an alarm, and activating means connecting said generating means and said siren means and being responsive to said square wave signal to activate said siren means;
    first passive means for arming said detection and alarm means;
    second passive means for arming an ignition cut-out circuit; and
    disarming means connected between said first means and said first and second passive means.

2. The passive security device of claim 1 and further wherein said first passive means includes paired transistor means having a base, an emitter and collectors, said base being connected to the electrical system, said emitter being connected to said disarming means, and said collectors being connected to said detection and alarm means.

3. The passive security device of claim 2 and further wherein said base is connected to the electrical system ignition switch "accessory" contact.

4. The passive security device of claim 2 or 3 and further wherein a filter means is connected to said base.

5. The passive security device of claim 2 or 3 and further wherein a filter means is connected to said collectors.

6. The passive security device of claim 2 or 3 and further wherein means for biasing said paired transistor means "off" is connected to said base.

7. The passive security device of claim 1 and further wherein said second passive means includes relay means connected to the electrical system, first switching means connected to said relay means and to said disarming means, and second switching means connected to said relay means, to said disarming means and to said first switching means; said relay means having an open and a closed position and being connected to a point between said ignition "on" contact and said starter, said first switching means having an "on" condition and an "off" condition, said second switching means having an "on" and an "off" condition; said first switching means permitting said relay means to move to said open position when said first switching means is in said "on" condition; said relay means permitting said second switching means to turn to said "on" condition when said relay means is in said closed position and said first switching means is in said "off" condition; said second switching means holding said first switching means in said "off" condition when said second switch is in said "on" condition.

8. The passive security device of claim 7 and further wherein said first switching means includes a silicon-controlled rectifier having a gate, said disarming means and said second switching means being connected to said gate.

9. The passive security device of claim 7 and further wherein said second switching means includes a transistor having a base, an emitter and a collector, said base being connected to a point between said relay means and said first switching means, said collector being connected to said disarming means and to said first switching means.

10. The passive security device of claim 9 and further wherein capacitor means is coupled to said base.

11. The passive security device of claims 1, 2 or 7 and further wherein said disarming means includes a normally closed switch having an open and a closed position, said switch permitting said device to automatically assume an armed condition when said switch is in said closed position; said switch being manually moveable to an open position to permit said device to assume a disarmed condition.

\* \* \* \* \*